United States Patent [19]

Snider

[11] 3,827,519
[45] Aug. 6, 1974

[54] VEHICULAR EXERCISER APPARATUS
[76] Inventor: John R. Snider, 1231 N. Lawrence Expy., No. 381, Sunnyvale, Calif. 94086
[22] Filed: Oct. 15, 1971
[21] Appl. No.: 189,614

[52] U.S. Cl.............. 180/25 R, 180/65 R, 280/282
[51] Int. Cl............................................. B62d 61/06
[58] Field of Search............ 180/65 R, 27, 34, 19 R, 180/65 A, 25 R; 280/282

[56] References Cited
UNITED STATES PATENTS
3,598,195   8/1971   Steller............................... 180/65 A
2,955,666   6/1959   Lindley.............................. 180/65 R
2,306,042   12/1942  Custer............................... 180/65 R
3,454,122   7/1969   Grady............................... 180/65 R Primary Examiner—Kenneth H. Betts
Assistant Examiner—J. M. McCormack
Attorney, Agent, or Firm—Schatzel & Hamrick

[57] ABSTRACT

A vehicular exerciser apparatus comprising a three-wheeled cycle having a saddle seat for supporting an individual and pedal means for propelling said cycle manually and an electrical motor train means for propelling said cycle independent from the manual power means and in combination with the manual propelling means.

2 Claims, 4 Drawing Figures

PATENTED AUG 6 1974　　　　　　　　　　　3,827,519

VEHICULAR EXERCISER APPARATUS

BACKGROUND OF THE INVENTION

The present invention relates to an exerciser apparatus for use by an individual. Heretofore, two wheeled and three wheeled manually driven cycles such as bicycles and tricycles have been widely used as means of transportation and for exercise. Such cycles have been used primarily by individuals having physical endurance. People without physical endurance need necessarily limit their use of such cycles and the distance they travel away from any desired location to which they desire to return.

It is frequently preferred by those people desiring or necessitating exercise to do so by means of bicycles and tricycles and to simultaneously travel to distances remote from any given location to which they desire to return. At the same time these individuals are reluctant to so travel for fear of being unable to manually propel the cycle to the return destination. Accordingly, the present invention provides a vehicular-exerciser apparatus which may be manually propelled or propelled by a motor upon demand by the individual. The apparatus provides for a lightweight structure which may be distributed so as not to materially disturb the balance of the vehicle and at the same time be relatively quiet so as not to audibly disturb the individual or those around him.

SUMMARY OF THE PRESENT INVENTION

The present invention provides for a vehicular-exerciser apparatus which may include a three-wheeled, foot-driven cycle. A motor means including an electrical motor and an electrical storage power source are mounted on the cycle in combination with a gear train for converting the motor power to the cycle. An electrical control means is provided to control the motor in response to the demands and controls of the individual such that the individual may propel the vehicle independent of the motor means or in combination with the motor means or by the motor means only.

DESCRIPTION OF PREFERRED EMBODIMENTS

Figures 1, 2, 3, 4:
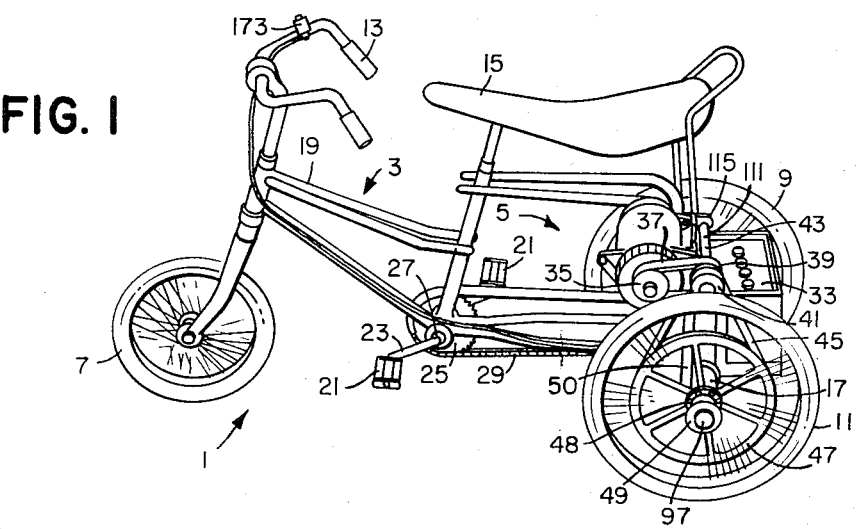
FIG. 1 is a perspective view of a vehicle incorporating the teachings of the present invention.
FIG. 2 is a view of the motor drive-train of the apparatus of FIG. 1.
FIG. 3 is an electrical circuit diagram of the electrical circuitry of the apparatus of FIG. 1.
FIG. 4 is an exploded view of the apparatus of FIG. 1 utilized for propelling the cycle of FIG. 1 by motor means.

FIGS. 1 and 2 illustrate a vehicular-exerciser incorporating the teachings of the present invention referred to by the general reference character 1. The vehicular-exerciser 1 includes a cycle in the form of a three-wheel cycle referred to by the general reference character 3 which may be propelled by pumping the feet of an individual and a motor train, referred to by the general reference character 5, adapted to permit the vehicle to be propelled by a motor independent of the manual propulsion of the individual or in combination with the manual propulsion of the individual.

The cycle includes three spoked wheels 7, 9 and 11 similar to a tricycle. The wheel 7 is a steering wheel controlled responsive to handle-bars 13 adapted to be controlled by an individual person sitting on a saddle seat 15. The wheels 9 and 11 are positioned in direct lateral alignment with one another along a housing supporting an axle train 17. The axle train 17 drives the wheel 9 responsive to pumping by the individual. The axle 17, seat 15 and handlebars 13 are supported by a framing 19 preferably of a plurality of interconnected tubes. Beneath the saddle seat 15 and in position for engagement by the feet of an individual riding on seat 15 are a pair of foot pedals 21 joined to a crank 23 in turn joined to a crank sprocket 25 which are adapted to rotate about the axis of a support shaft 27. The crank sprocket 25 is engaged to a drive chain 29 extending to a rear sprocket 30 and gear train 31 mounted about the rear axle 17 to drive the wheel 9. Motion may be imparted to the vehicle 1 by an individual sitting on the saddle seat 15 and pumping the crank 23. The wheel 9 serves as the drive wheel for manual pumping.

The motor train 5 is further adapted to propel the vehicle 1 and includes a direct current electrical motor 32 powered by a direct current storage battery 33. The motor 32 has a motor drive pulley 35 coupled by a belt 37 to a transmission means in the form of a pair of pulleys 39 and 41. The pulleys 39 and 41 are journaled to a common axle 43 and the pulley 39 serves as a transmission driven pulley driven by the motor 32. The pulley 41 is driven by the pulley 39 and in turn serves as a driver coupled by means of a belt 45 to a driven pulley 47 coaxial with the axle train 17. The driven pulley 47 is journaled to the wheel 11 by means of a hub 48 secured to a hub 49 of the wheel 11 such that said pulley 47 serves as a wheel-drive pulley.

The motor is mounted to the frame of the cycle 3 by means of a pair of brace columns 50 and 51 extending vertically from the axle housing 17. The columns 50 and 51 are secured to the axle 17 by means of a pair of U-clamps 53 and 55 having a pair of nuts 57 and a pair of nuts 59 respectively. The clamp 53 extends through a pair of apertures 61 of the brace 50 to receive the nuts 57 to secure the clamp 53 and brace column 51 in place. The clamp 55 extends through a pair of apertures 63 to receive the nuts 59 to secure the clamp 55 and brace column 51 in place. Near the top terminal end of the brace column 50 is an aperture 65 and near the top end of the brace 51 is an aperture 67 with the aperture 65 and 67 in alignment to one another. The motor 32 carries a pair of studs 69 and 71 with the stud 69 having an aperture 73 and the stud 71 having an aperture 75. The studs 71 and 69 are laterally spaced apart so as to respectively align the aperture 73 with the aperture 65 of the column 50 and the aperture 75 with the aperture 67 of the column 51. A pair of fastening pins 77 and 79 are provided to respectfully interlock the motor studs 69 and 71 with the braces 49 and 51. A pair of lock nuts 81 and 83 are provided for engagement with the pins 77 and 79, respectively, such that by loosening said nuts 81 and 83, the motor 32 may be pivoted about the pins 77, 79 and the column braces 50 and 51. The brace 50 carries an aperture 84 near the lower terminal end. The motor 32 carries a laterally projecting stud 85 projecting laterally from the stud 73. The motor stud has an aperture 86. A cross motor support member 87 is provided with a pair of apertures 89 and 91 at opposite terminal ends for respective alignment with the aperture 84 of the brace column 50 and the aperture 86 of the motor stud 85. A pair of fastener pins 93 and 95 are provided for engagement within the apertures 89 and 91 respectively to brace and support the motor 32 relative to the brace column 50. The motor support member 87 may be disconnected at either the pins 93 and 95 to permit the motor 32 to be rotated about the pins 77 and 79 within the apertures 73 and 75.

The motor 32 further includes an electro-mechanical clutch assembly 97 to control the gear ratio engagement and disengagement of the drive pulley 35 to the motor 32. The motor train 5 is adapted so as to drive the wheel 11 of the cycle 3 such that for motor driven operation, the wheel 11 serves as the drive wheel. Electrical excitation to the motor 32 and to the clutch assembly 97 is received at a terminal strip 105 for receiving electrical excitation for powering the motor 32 and controlling the clutch 97.

The brace columns 50 and 51 further support near the top end the pulleys 39 and 40 journaled to a common shaft 111. The shaft 111 is supported by a pair of pulley support studs 113 and 115 secured to the brace columns 50 and 51. The motor 32, through the clutch assembly 97, drives the pulley 35 in turn driving the pulley 39 on the common shaft 111 in turn driving the pulley 40 and the belt 45. The belt 45 in turn drives the driven pulley 47 of increased diameter which is secured to the hub 49 of the wheel 11 of the cycle 3 such that there is direct drive of the wheel 11 by the pulley 47. The hub 48 of the pulley 47 is secured to the hub 49 of the wheel 11 by means of a plurality of fastener bolts 117.

The storage battery 33 is supported by a casing 125 including a pair of U-clamps 127 and 129 adapted to be engaged about the rear axle 17 of the cycle 3. The clamps 127 and 129 are secured to a rear plate 131 of the casing by means of protruding through a pair of apertures 133 and a pair of apertures 135, respectively. The U-clamp 127 receives a plate 137 and a pair of fastener nuts 139 to secure the clamp 127 in place. The clamp 129 receives a plate 141 and a pair of fastener nuts 143 to secure it in place. The wall 131 is secured to a pair of side walls 145 and 147 in turn engaged to a bottom wall 149 and a front wall 151 to form the battery casing. The casing 125 is reinforced by means of a pair of cross support member 153 and corner support member 155. The casing 125 is adapted to receive the wet storage battery 33. The casing 125 is adapted to permit ready replacement of the battery 33 or for recharging of the battery while the battery is in place in the casing 125. The battery may be recharged merely by attaching a battery charger to the battery 33 which battery charger in turn plugged into a common electrical alternating current outlet.

Manual control means is included to permit the rider to control actuation of the motor train 5 such that the rider may pump the vehicle 3 without aid of the motor train 5 or activate the motor train 5 to propel the vehicle with or without aid of pumping. Joined to the brace column 51 is a motor starter solenoid 161 having a bracket 163 with an aperture 165. The aperture 165 is engaged to the column 51 for support. The starter 161 carries a pair of terminals 167 and 168 adapted to engage wires extending to the battery 125 and to the motor 32 respectively. The starter 161 further carries a terminal 169 adapted to engage a wire extending to a push-button switch 173 adapted to be mounted to the handle bars 13 by means of a U-shaped bracket 175 and a securing pin 177. The switch 173 is mounted on the handlebar so as to be hand operated by the individual riding the cycle. The switch 173 is in the form of a "dead-man" switch such that the switch 173 is activated when depressed by the hand of the individual and automatically deactivated when hand pressure is released. The equivalent electrical wiring diagram for the motor train 5 is illustrated in FIG. 3.

The present invention provides for a relatively simplified system for an individual to convert a manually propelled cycle to a motor propelled vehicle which requires only limited mechanical or technical skill. The motor assembly 5 may be mounted to a three-wheeled manually propelled vehicle by means of the various brackets and fastener pins. The driven pulley 47 may be easily secured to the rear wheel 11 by removal of the rear wheel 11 from the framing 19 and mounting the pulley hub 48 to the wheel hub 49 and then securing the drive belt 45. The motor assembly 32 and transmission assembly may be secured through means of the columns 50 and 51 and the belt 37 secured thereto. The battery casing 125 may be mounted about the rear axle train 17 by means of the rear clamps 127 and 129. The starter solenoid 161 and switch 173 may be secured and then electrical cables interconnected. Accordingly, an individual may mount or dismount the motor train apparatus 5 without mechanically or structurally altering the cycle. The motor train apparatus 5 may be transferred to various cycles with relative ease. Once installed the cycle may be retained in balanced equilibrium by placing the motor assembly 32 as illustrated to one side of center to drive a wheel as illustrated and to counter-balance the resultant torque arm created by the motor assembly, the storage battery casing 125 may be offset towards the opposite wheel to create the balance.

In operation the motor train apparatus 5 does not interfere with the manual means of propelling the vehicle 1. An individual exercising and manually propelling this apparatus 1 may do so in the standard means by pumping the foot pedals 21. When propelled by the foot pedals 21 the unit 1 operates by standard means. In the event the individual becomes tired or unable to pump further he merely activates the switch 173 and the motor train apparatus 5 propels the vehicle through means of the pulley 47. The individual may simultaneously propel the cycle through use of the foot pedals 21 or rest the foot pedals 21. At any time that the operator desires to stop the vehicle 1, he merely releases the switch 173 and applies the brakes of the vehicle in the normal manner. In the illustrated embodiment the cycle utilizes a coaster brake.

The apparatus 1 provides a vehicular-exerciser vehicle which an individual may operate and utilize for transportation over long distances without apprehension of becoming overly tired or exhausted and being unable to return to a designated location. The individual may continuously operate under manual power or by means of the power pack or he may operate the vehicle interchangeably manually or by the power pack.

I claim:

1. A motor drive train apparatus for mounting on the frame of a pedal-driven tricycle having a pair of laterally displaced wheels to provide a motor drive for propelling said tricycle by motor power delivered to at least one of said lateral wheels and to permit said tricycle to be propelled by motor power and/or pedal power, the apparatus comprising, in combination:
- an electric drive motor having a motor drive pulley assembly;
- a pair of parallel brace columns for simultaneously engaging the drive motor and the frame of a tricycle for supporting said motor intermediate two lateral wheels of the tricycle with the axis of rotation of said motor drive pulley assembly being substantially parallel with the axis of rotation of said two lateral wheels;
- first fastener means for fastening said brace columns parallel to one another to the frame of the tricycle with said columns projecting at substantially right angles from the frame and adjacent one of said lateral wheels and second fastener means for fastening the motor to each of the brace columns with the brace columns supporting said motor in an elevated position relative to the frame;
- a driven pulley having a hub and fastener means for securing said hub of the driven pulley to and coaxial with a hub of one of said two lateral wheels of the tricycle with the driven pulley in line with the motor drive pulley assembly;
- a first drive belt for interconnecting said motor drive pulley assembly and the driven pulley for transmitting rotary power from said motor to said driven pulley;
- a storage battery casing encasing a storage battery, said casing including fastener means for fastening the casing to the frame of the tricycle intermediate said two lateral wheels of the tricycle and laterally relative to the motor such that the lateral torque arm established by the motor is at least partially counterbalanced by the lateral torque arm established by the storage battery casing; and
- electrical power control means electrically interconnected with said motor and said storage battery to control electrical excitation of said motor, the electrical power control means including a manually controlled switch such that an individual riding said tricycle may manually control the motor drive.

2. The motor drive train apparatus of claim 1 wherein said motor is journaled to a drive pulley, and further including
- a transmission means intermediate said drive motor and said driven pulley for transmitting rotary power from said motor to said driven pulley, the transmission means including a pair of back-to-back transmission pulleys coaxial with one another, and journaled to a common shaft, said shaft being supported by said brace columns along an axis parallel to the axis of rotation of said two lateral wheels, one of said transmission pulleys being coupled to the drive pulley of the drive motor by a second drive belt and the other of said transmission pulleys being coupled to the driven pulley by said first drive belt.

* * * * *